United States Patent Office 3,709,932
Patented Jan. 9, 1973

3,709,932
PHOSPHONOUS DICHLORIDES
Eugene H. Uhing, Ridgewood, N.J., assignor to Stauffer Chemical Company, New York, N.Y.
No Drawing. Filed Sept. 22, 1969, Ser. No. 860,058
Int. Cl. C07f 9/48
U.S. Cl. 260—543 P   10 Claims

ABSTRACT OF THE DISCLOSURE

Organophosphonous dichlorides are produced by reacting phosphorus trichloride with a hydrocarbon, e.g., a lower alkane, lower alkene, benzene, or a substituted derivative thereof at a temperature in excess of 350° C. in the presence of phosgene. These phosphonous dichlorides are useful as toxicants and chemical intermediates in many syntheses.

BACKGROUND OF THE INVENTION

The high temperature reactions of alkanes and benzene with phosphorus trihalides are well known in the art. Aliphatic halophosphines have been prepared according to the process of U.S. Patent 3,210,418 which encompasses the reaction of phosphorus trihalide, with a lower aliphatic hydrocarbon at temperatures above 350° C. Increased yields are obtained by employing oxygen, chlorine, or nitric oxides in gaseous form as catalysts. However, the chlorine catalyzed reaction also yields solid residues which tend to deposit outside of the heated zone and eventually cause clogging. Furthermore, the oxygen catalyzed reaction yields by-products such as alkyl phosphonic dichlorides and phosphorus oxyhalides which are highly corrosive toward the apparatus. U.S. Patene 3,-029,282 discloses a method for making phenylphosphonous dichloride by reacting benzene and phosphorus trichloride at a temperature above 350° C. in the presence of monochlorobenzene. However, to obtain good yields, the monochlorobenzene must be present in amounts ranging from 2 to about 5 mole percent. Further, this reaction yields large amounts of chlorophenylphosphonous dichloride and various solid by-products.

GENERAL DESCRIPTION OF THE INVENTION

It has now been discovered that the high temperature reaction of phosphorus trichloride with benzene, lower alkanes and lower alkenes and certain substituted derivatives thereof is unexpectedly and substantially improved by carrying out the reaction in the presence of a catalytic amount of phosgene. The conversions and yields obtained are significantly higher than when no catalyst is employed. Furthermore, there is less by-product formation and those by-products formed are substantially all in liquid form rather than the solid form obtained when chlorine or oxygen are employed as catalyst, and are, therefore, much easier to remove from the reaction apparatus. The phosphonous dichlorides produced by the present invention are useful as chemical intermediates. They can be oxidized to the phosphorus oxydichlorides from which known plasticizers can be made. They can also be hydrolyzed to form the phosphinic acid derivatives which have utility as plastic stabilizers.

DETAILED DESCRIPTION OF THE INVENTION

In accordance with the present invention organophosphonous dichlorides having the formula:

wherein R is a hydrocarbon radical which can be a lower alkyl, a lower alkenyl, benzene or substituted derivatives thereof are produced by reacting a hydrocarbon which can be a lower alkane, lower alkene, benzene or substituted derivative thereof with phosphorus trichloride in the presence of phosgene. Illustrative of the compounds which are produced by the present invention are the following: methylphosphonous dichloride, ethylphosphonous dichloride, chloromethylphosphonous dichloride, 2,2,2-trifluoroethylphosphonous dichloride, propylphosphonous dichloride, butylphosphonous dichloride, phenylphosphonous dichloride, chlorophenylphosphonous dichloride, 1,2,4-trichlorophenylphosphonous dichloride, fluorophenylphosphonous dichloride, naphthylphosphonous dichloride, styrlphosphonous dichloride, and cyanophenylphosphonous dichloride.

Suitable hydrocarbons for the present invention are the lower alkanes, lower alkenes, benzene, and their substituted derivatives. By lower alkanes and alkenes, it is meant to designate those saturated and unsaturated hydrocarbons having from 1 to about 4 carbon atoms. Representative of these hydrocarbons are: methane, ethane, propane, butane, ethylene, propylene, and butene. It should be noted that at the high reaction temperatures employed, considerable hydrocarbon cracking takes place. Therefore, when butane is employed, the product is a mixture of methyl, ethyl, propyl and butylphosphonous dichloride, rather than pure butylphosphonous dichloride. Benzene and styrene are also particularly suited to the process of the present invention. Various substituted derivatives of the above-mentioned hydrocarbons are also used in the present invention. The substituent must be unreactive toward the phosgene and phosphorus trichloride and the derivative must have a high thermal stability. Suitable substituents include the cyano group; fluorine and chlorine. Exemplary of the derivatives which can be employed are: chloromethane, chloroethane, fluoromethane, 2,2,2-trifluoroethane, 2,2-difluoroethylene, monochlorobenzene, 1,2,4-trichlorobenzene and benzonitrile. Methane, ethane, ethylene and benzene are the preferred hydrocarbons for the present invention.

The catalyst employed in the present invention is phosgene (carbonyl chloride). Extreme caution should be employed when using this gas since it is highly toxic. Carbonyl bromide will also catalyze the reaction of phosphorus trichloride with various hydrocarbons, but to a much lesser extent than does phosgene due to various side reactions, particularly bromination.

The proportion of the reactants employed can be varied over a wide range, depending upon the temperature hydrocarbon employed and the reactor. Normally, the phosphorus trichloride and the hydrocarbon are present in the vapor mixture in about stoichiometric proportions, i.e., 1:1 molar ratio. However, larger proportions of phosphorus trichloride or the hydrocarbon can be used and the excess recirculated. The phosgene can be employed in the range from about 0.1 to about 10.0 mole percent per mole of the phosphorus trichloride-hydrocarbon vapor mixture. Preferably, the phosgene is present from about 0.2 to about 1 mole percent.

The temperature range over which our reaction takes place is quite broad. There are indications that some reaction begins as low as about 350° C. The upper temperature limit will be determined by the thermal stability of the product. For example, the benzene-phosphorus trichloride reaction can be run at temperatures up to about 900° C. without excessive decomposition of phenylphosphonous dichloride. The preferred temperature range is from about 450° C. to about 750° C.

The reaction of the present invention can be run in any suitable apparatus designed in such a manner as to effect the reaction under the conditions outlined herein. It can be run batchwise or continuously. Since the by-products formed in the present invention are liquid and there is very little carbon deposit formed, this invention is particularly suited to the use of a thin tube or packed tube reactor which thereby increases the rate of production of the product.

The present invention will be further illustrated by the following examples.

EXAMPLES

Examples 1 to 5 demonstrate the catalytic effect of phosgene upon the phosphorus trichloride-lower alkane embodiment. The reactor employed is a hot tube which consists of a ¾ inch by 18 inch Hastelloy C pipe packed with porcelain rings. The alkane and catalyst are mixed and then enter the hot tube at one end through ⅛ inch SS pipe which penetrates 2 inches into the hot tubes. There is also a gas inlet for the phosphorus trichloride at this end of the tube. The reactor is fitted with a cold finger Dry Ice trap at the opposite end which removes phosphorous trichloride from any excess alkane and hydrochloric acid before they are vented. Low levels of alkane are used to allow the phosphorus trihalide to be recycled after separation at the Dry Ice trap. The through-put rate of vapor is 7–8 moles per hour and the temperature is maintained at 625° C.

TABLE I

| Example Number | Alkane | Vapor input (mole percent) | | | Alkyl phosphonous dichloride production rate (gm./hr.) |
|---|---|---|---|---|---|
| | | Alkane | PCl₃ | COCl₂ | |
| 1 | Ethane | 11 | 89 | | <1.0 |
| 2 | do | 11 | 88 | 0.6 | 11.3 |
| 3 | do | 5 | 94 | 0.6 | 9.8 |
| 4 | Methane | 11 | 89 | 0.6 | 7.0 |
| 5 | Methyl chloride | 11 | 89 | 0.6 | 10.0 |

Examples 6–10 employ benzene in the same reactor as used in the above examples. The through-put rate is 6.6 moles per hour, and the temperature is maintained between 650°–675° C. Table 2 contains the results of these examples.

TABLE 2

| Example Number | Input vapor (mole percent) | | | Production rate (gms. 1 hr.) | |
|---|---|---|---|---|---|
| | Benzene | PCl₃ | COCl₂ | Phenyl-phosphonous dichloride | Chlorophenyl-phosphonous dichloride |
| 6 | 40 | 60 | 0.0 | 8.2 | 0.03 |
| 7 | 39 | 61 | 0.3 | 22.0 | 0.3 |
| 8 | 49 | 51 | 0.5 | 27.0 | 0.4 |
| 9 | 45 | 54 | 1.1 | 36.0 | 1.0 |
| 10 | 40 | 59 | 1.1 | 42.0 | 1.4 |

The catalytic effect of phosgene is clearly demonstrated in Tables 1 and 2 with respect to the lower alkanes, their chlorinated derivatives and benzene. It is obvious that the chlorinated derivatives of benzene would also undergo this catalysis, as evidence by the fact that increasingly larger amounts of chlorophenylphosphonous dichlorides are produced in the benzene reaction. Further it is obvious that the fluorinated derivatives of the lower alkanes and benzene can also be employed in this invention, since they are more stable under the reaction conditions than the chlorinated derivatives. In like manner, ethylene and styrene are also very well suited for the present invention due to their thermal stability. When ethylene is employed in the present invention, the product is vinylphosphonous dichloride, whereas when styrene is employed the product is a mixture styrlphosphonus dichlorides.

Examples 11–14 are conducted in the same reactor as described above. Examples 11–13 employ benzene and phosphorous trichloride using various catalysts known in the art. Example 14 employs the process of the present invention. Residue analysis are contained in Table 3.

TABLE 3

| Example Number | Catalyst | Amount of residue (percent based on PCl₃) | Physical state | Analysis percent | |
|---|---|---|---|---|---|
| | | | | P | Cl |
| 11 | None | 5 | Solid | 27 | 6 |
| 12 | Chlorobenzene | 5 | do | 20 | 15 |
| 13 | Chlorine | 4 | do | 16 | 7 |
| 14 | Phosgene | 1 | Liquid | 18 | 29 |

Employing ethane as the hydrocarbon, approximately 3 times as much solid residue is obtained when oxygen is used as a catalyst than when phosgene is used.

From the above data, it is noted that less residue is formed when employing the process of the present invention and this residue is in the much preferred liquid form. Further, it has the closest analysis to the desired product (phenylphosphonous dichloride=17.4% P; 39.6% Cl).

What is claimed is:

1. The process for making an organophosphonous dichloride having the formula:

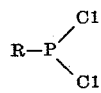

wherein R is a hydrocarbon radical selected from the group consisting of lower alkyl, benzene and the chlorine, fluorine and cyano substituted derivatives thereof comprising reacting phosphorus trichloride and a hydrocarbon selected from the group consisting of lower alkane, benzene and the chlorine, fluorine and cyano substituted derivative, thereof in the presence of from about 0.1 to about 10 mole percent per mole of phosphorus trichloride-hydrocarbon mixture of phosgene at a temperature of at least 350° C.

2. The process of claim 1, wherein the hydrocarbon is selected from the group consisting of methane and ethane.

3. The process of claim 1, wherein the hydrocarbon is benzene.

4. The process for making organophosphonous dichloride having the formula:

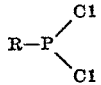

wherein R is a hydrocarbon radical selected from the group consisting of lower alkyl, lower alkenyl, benzene and the chlorine, fluorine and cyano substituted derivatives thereof comprising reacting phosphorus trichloride and a hydrocarbon selected from the group consisting of lower alkanes, lower alkenes, benzene and the chloride, fluorine and cyano substituted derivatives there of in the presence of phosgene in an amount from about 0.1 to about 10 mole percent per mole of the phosphorous trichloride-hydrocarbon mixture at a temperature of at least 350° C., and recovering the organophosphonous dichloride.

5. The process of claim 4 wherein the temperature is in the range of from about 450° C. to about 750° C.

6. The process of claim 4 wherein the hydrocarbon is benzene.

7. The process of claim 4 wherein the hydrocarbon is methane.

8. The process of claim 4 wherein the hydrocarbon is ethane.

9. The process of claim 4 wherein the hydrocarbon is ethylene.

10. The process of claim 4 wherein the hydrocarbon is chloromethane.

References Cited

UNITED STATES PATENTS 3,210,418   10/1965   Pianfelti _____ 260—543 P

LORRAINE A. WEINBERGER, Primary Examiner

R. GERSTL, Assistant Examiner

U.S. Cl. X.R.

260—465 R, 465.1, 465.9